A. F. KESSLER.
STRAP FORMING MACHINE.
APPLICATION FILED MAY 13, 1910.
1,014,065.
Patented Jan. 9, 1912.
3 SHEETS—SHEET 3.
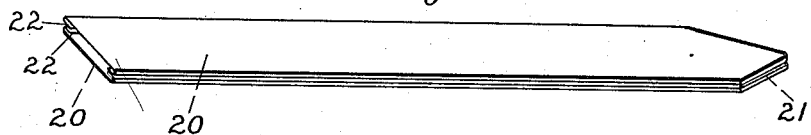
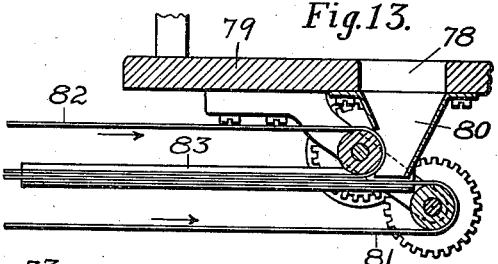
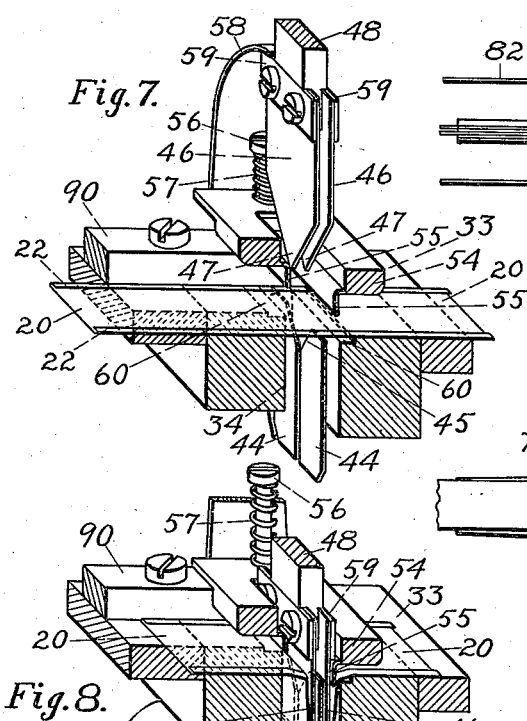
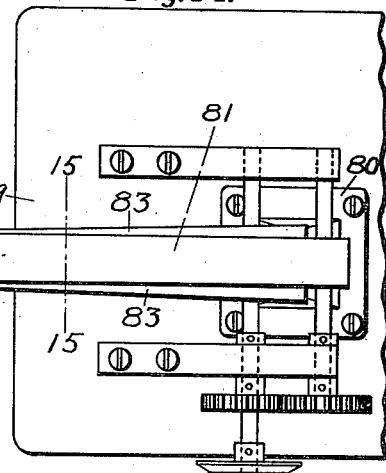
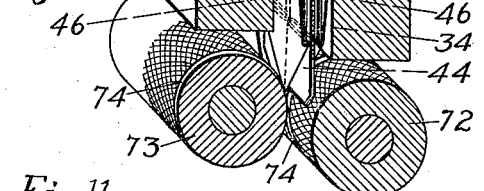
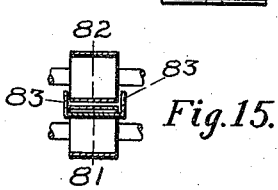
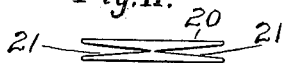
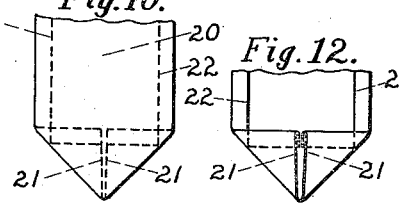

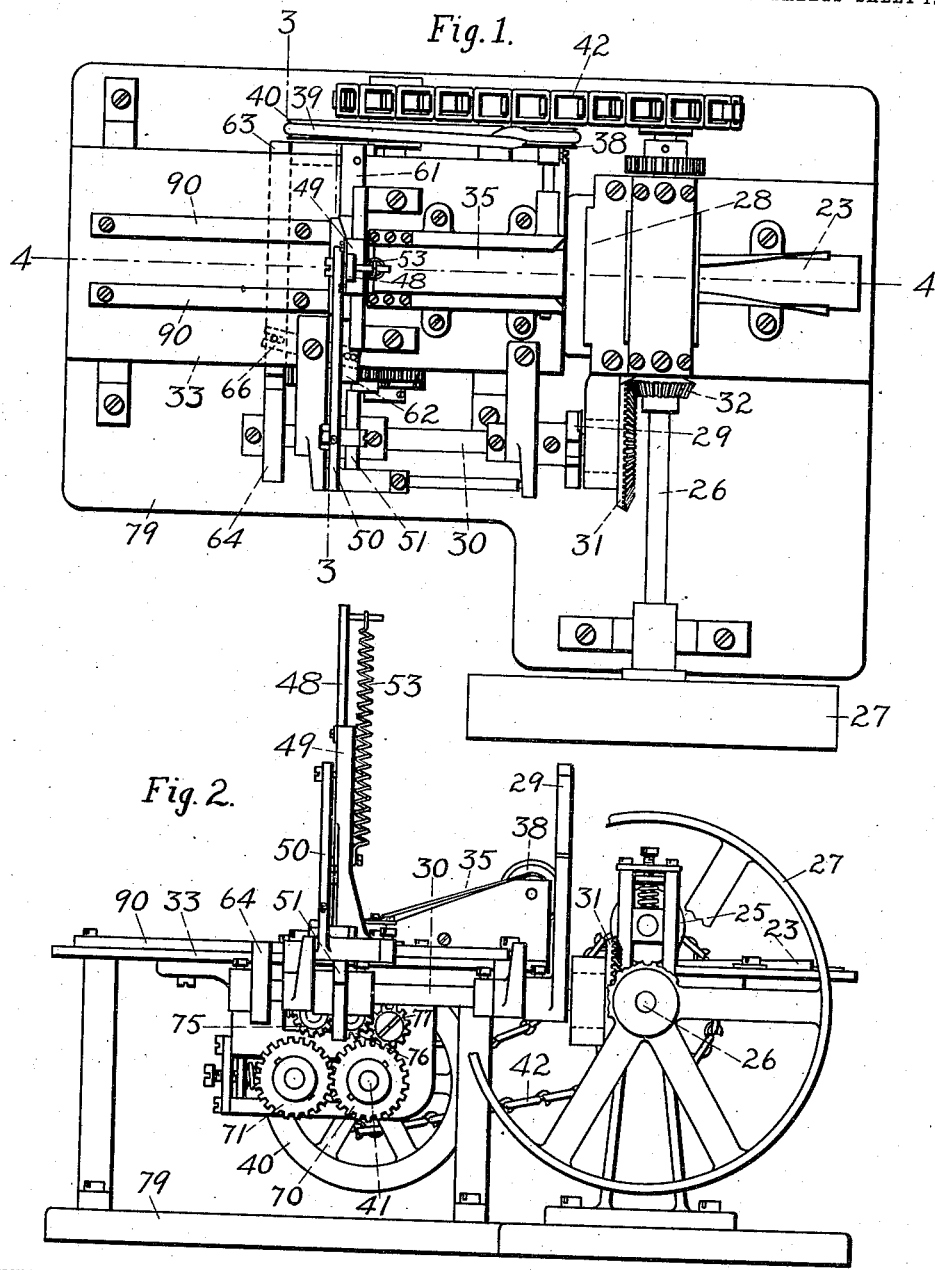

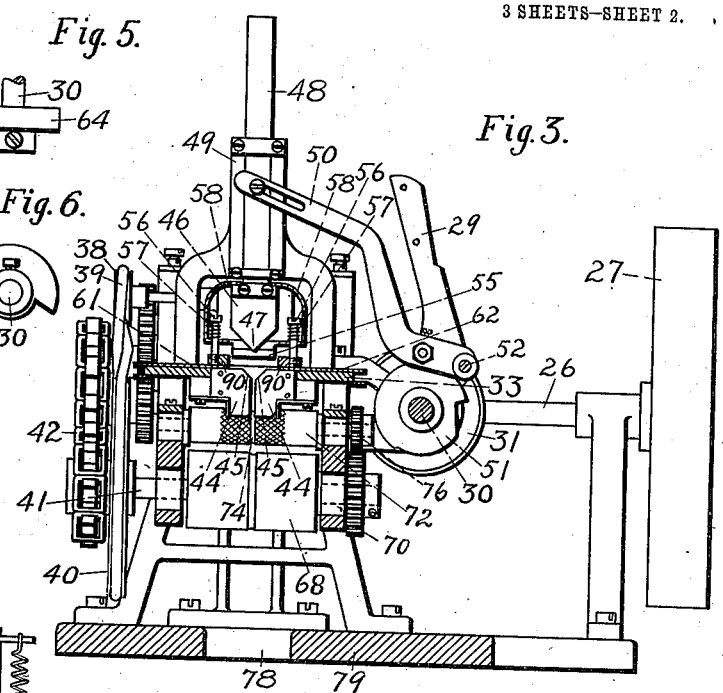

UNITED STATES PATENT OFFICE.

ALBERT F. KESSLER, OF UTICA, NEW YORK.

STRAP-FORMING MACHINE.

1,014,065.  Specification of Letters Patent.  Patented Jan. 9, 1912.

Application filed May 13, 1910. Serial No. 561,060.

*To all whom it may concern:*

Be it known that I, ALBERT F. KESSLER, a citizen of the United States, residing at Utica, in the county of Oneida and State of New York, have invented certain new and useful Improvements in Strap-Forming Machines, of which the following is a specification.

This invention has for its object to provide a machine for producing the pointed fold in the back-straps used on men's drawers. So far as I am aware, these straps have heretofore been made only by hand, and by a method differing from that of my present invention.

Of the accompanying drawings, Figure 1 represents a top plan view of a strap-forming machine constructed according to my invention. Fig. 2 represents a side elevation thereof, partly broken away. Fig. 3 represents a transverse section on the line 3—3 of Fig. 1. Fig. 4 represents a longitudinal section on the line 4—4 of Fig. 1. Fig. 5 is a plan view of the mechanism used for closing the slot in the table when the material is fed over it. Fig. 6 represents a rear elevation of said mechanism. Fig. 7 is a sectional perspective view representing the parts concerned in the folding operation, with the doubling blades in their raised or retracted position. Fig. 8 is a similar view showing the parts in their operative position. Fig. 9 represents a perspective view of the folded strap produced by the machine. Fig. 10 represents an elevation of the lower portion of said strap. Fig. 11 is an end view of said lower portion. Fig. 12 is a longitudinal section of said lower portion. Fig. 13 is a longitudinal section showing a carrier with which the machine may be equipped for conveying the folded straps. Fig. 14 is a reverse plan view of said carrier. Fig. 15 is a section on the line 15—15 of Fig. 14.

The form of a strap made by this machine is represented in Figs. 9 to 12 and it consists of a strip of cloth doubled to form two plies 20, 20 and a pointed end made by tucking or folding inwardly the two corners of the doubled strap as shown at 21. This is done by acting with formers on the material at the end of the folded blank while the latter is being advanced by the doubling devices. The two side edges of each ply may be turned inwardly to form hem folds 22, prior to doubling and pointing the end of the strap. The old hand method consisted in pinching the sides of the extended blank together at the middle, stitching it across as thus longitudinally doubled, and then flattening the plies together to make a pointed end similar in appearance to that shown in the drawings, but different therefrom in having the internal stitching, which by my method is rendered superfluous.

With this machine, in its preferred form as illustrated, a continuous strip of material is fed horizontally and its edges turned over by folding-guides to form the hem folds as it progresses toward the folding-table, and when a length of material sufficient to form one strap is positioned over the folding-table it is automatically cut off. The folding slot is closed by a pair of fillers or blank-supports to prevent the advancing edge of the strip from catching in the slot, and the strip is held flat and smoothed out during its advance by means of a belt running faster than the strip. When a length of strip has been positioned on the folding-table and cut off, the slot-fillers or supports under the middle part of the blank are withdrawn and a pair of breaker blades descend upon said middle part, slightly depressing the same into the folding slot and holding the blank accurately in position for the action of the doubling and folding devices. These latter comprise a pair of stationary former blades arranged underneath the folding-table, and a pair of vertically-reciprocating doubling and folding blades adapted during their descent to double the blank and fold the middle parts inwardly by forcing them between the stationary former blades to make the pointed end of the strap, the latter being then drawn down between knurled rollers which introduce it to another pair of rollers for setting the folds, from whence the folded strap may be passed to a conveyer which may deliver it to a sewing-machine for stitching the sides.

The strip of material to form the blanks from which the straps are made is fed into the machine from the right as viewed in Figs. 1, 2, 4, 7, and 8, and passes first into the folding-guide 23 and then between the geared feed-rollers 24, 25, the former of which is mounted upon the main drive-shaft 26 having at its end the drive-pulley 27. 28 is a stationary shear-blade located just beyond these feed rollers, and 29 is a revolving shear-blade mounted on a longitudinal shaft 30 connected by bevel-gears 31, 32 with the main shaft 26, the revolving blade coöperating with the fixed blade to cut off the strip in lengths to form the strap blanks.

33 is the folding table interrupted by the folding-slot 34 and above this table is a belt 35 for the purpose of holding the strip flat as it approaches and crosses the slot, and smoothing out any wrinkles therein, this belt traveling somewhat faster than the peripheral speed of the rollers 24, 25. The belt 35 is mounted on a pair of drums 36, 37 of which the upper one 37 has a pulley 38 driven by a belt 39 from a pulley 40 on a shaft 41, the latter being rotated by sprockets and a chain 42 from the main shaft 26.

43 is a fixed guard or stripper adjacent to the delivery end of the lower stretch of belt 35 to prevent the material from clinging to said belt.

44, 44 are the stationary forming-blades suitably mounted in the folding slot 34, these blades being in the same plane with each other and having their adjacent edges separated by a slight distance for the passage of the vertical edges of the folds 21 in the strap, the upper edges of said blades being beveled at 45 so as to start the folds 21.

46 are the movable doubling and folding blades having pointed lower ends 47 whose working edges stand at right-angles to each other, or at 45° to the line of movement, these blades being rigidly attached to a slide 48 mounted in stationary guides 49 and actuated through a lever 50 by a cam 51 on the longitudinal shaft 30, said lever being pivoted at 52, and the cam serving to raise the slide 48 against the tension of a spring 53.

54 is a rectangular frame carrying a pair of breaker blades 55 and guided on two posts 56 which are surrounded by springs 57 tending to depress said blades, the latter with their frame being raised by the slide 48 through the medium of a pair of hooked plates 58 attached to frame 54 and taking over shoulders 59 formed by the upper ends of the folding blades 46 and their attaching plates. When the slide is in its highest position these breaker blades are raised above the level of the table to allow the strip to pass underneath, and when the slide starts to descend these blades drop and carry with them the middle part of the strap blank, their pressure on the material underneath them being sufficient to bend it and hold the blank from sluing when the doubling blades act upon it, but insufficient to impose any objectionable drag upon the passage of the blank from under the breaker blades.

61 and 62 are a pair of filler sliding plates or supports running in grooves 60 formed in the walls of the slot 34, and movable oppositely toward and from each other to alternately cover and uncover said slot. The plate 61 is carried by a transverse slide 63 operating under the table 33, which is moved in one direction by a cam 64 mounted on the longitudinal shaft 30, and returned by a spring 65. A lever 66 pivoted in its middle at 67 is connected with the other plate 62 and with the slide 63 by pin-and-slot devices, and thus receives a motion equal to and opposite from that of the plate 61. These plates are timed to close together and form a bridge over the slot 34 for the advancing edge of the strip of material after the blades 46 have risen out of said slot, and to open again before said blades descend to double and fold the blank.

68, 69 are a pair of feed rolls to receive, press, and downwardly advance the folded and doubled blank, one of these rolls being mounted directly on the shaft 41 and the shaft of the other being connected with shaft 41 by gears 70, 71. The peripheral speed of these rolls preferably slightly exceeds that of the rolls 24, 25. Above the rolls 68, 69 is a pair of nipping rolls 72, 73 of smaller diameter knurled on their acting portions and circumferentially grooved at 74 to receive the end of the strap as it is forced downwardly between them by the blades 46, and to advance said strap into the bite of the rolls 68, 69. The grooving of these upper rolls at the place where the points of the blades 46 enter avoids any tendency to cut the point of the strap, especially if the edges of the groove are rounded and if made of a semi-yielding material. The bearings of these rolls 72, 73 are also preferably mounted in any suitable way so as to yield slightly, and the bearings of one or more of the rolls of the other pairs described may be similarly mounted, this being a well-known expedient illustrated in my drawings but requiring no special description. The pressure between the smaller or first pair of fold-setting rolls 72, 73 is preferably less than that between the second pair 68, 69, in order to readily admit the points of the blades 46 between these first or nipping rolls and insure a proper hold upon the advancing end of the strap. The greater pressure between the rolls 68, 69 insures a permanent crease or setting of the folds. The rolls 72, 73 are driven by gearing 75, 76, 77 from the gear 70 on shaft 41 and their peripheral speed is the same as that of the rolls 68, 69.

An opening 78 is formed in the bed 79 for the passage of the folded straps, and if desired there may be mounted below this opening, as represented in Figs. 13, 14, 15, a chute 80 for delivering the straps to a pair of carrier belts 81, 82 combined with a pair of stationary converging side guides 83 for conveying the straps in a properly alined condition to a sewing-machine (not shown) which stitches the side edges of the plies 20 together.

The operation will be readily understood. As the continuous strip of material is fed in through the folding-guide 23 and between the rolls 24, 25, its edges are turned over to form the hem folds 22, and when the proper length of strip to form a strap blank has been fed over the table 33, the revolving shear-blade or knife 29 in coöperation with the stationary blade 28, severs the strip transversely. The forward end of the strip advances across the folding-slot 34 while the doubling and folding blades 46 and breaker-blades 55 are raised and while the filler plates or supports 61, 62 are across the slot, and during this advance the belt 35 holds down and smooths out the strip. The filler-plates may be withdrawn as soon as the blank has crossed the slot, and when fully across, the slide 48 descends, allowing the breaker blades to start the fold, and while the frame 54 is arrested upon a pair of fixed strip-guides 90 the blades 46 continue to descend to the position represented in Fig. 8, and force the blank by its middle down through the slot 34 and against the stationary forming plates 44, the blades 46 descending on opposite sides of said plates 44. This causes the folds 21 to be formed and their vertical edges pass between the plates 44 while their diagonal edges are shaped against the blades 46, whose working edges, being at angles of 45° to the line of movement, permit the inner bends of the folds 21 to take a vertical position. It is of course not essential to shape the strap-end with diagonal edges meeting at a sharp point and the blades might be shaped otherwise, although this form of strap is preferred in the trade. The folding blades descend far enough to introduce the lower end of the strap between the rolls 72, 73 as above described and are then withdrawn upwardly while the strap continues to feed downwardly between said rolls and the lower feed rolls 68, 69, from whence it passes through the openings 78 and may be delivered to the belts 81, 82 or otherwise disposed of.

It will be noted that the parallel doubling and folding blades 46, moving in a straight line through the narrow slot 34 and past the fixed thin forming-plates 44, substantially complete the shaping of the fold before the setting of the latter begins in the nip of the rolls 72, 73. There is therefore little or no opportunity for an imperfect fold or one whose proper completion depends upon the qualities of the material, and I am thus enabled to successfully form a tapered strap-end in ordinary cotton or linen cloth, which has very little stiffness. The rigid and parallel connection of the twin blades 46 further insures their proper relative timing, unaffected by wear in the working parts.

Without departing from my invention, various changes may be made in the machine for automatically performing the above-described operations or any of them, related to the doubling, folding and pointing or analogous shaping of a strip of material.

I claim,—

1. In a strap-folding machine, the combination of means for supporting the blank preparatory to doubling it, a stationary former for folding or tucking the doubled end of the blank, a pair of feed-rolls mounted for relatively-yielding movement, a pair of doubling and folding blades mounted to reciprocate past said former and adapted to introduce the doubled and tucked end of the strap to the nip of said feed-rolls, and a second pair of feed-rolls located posterior to the first-said pair and adapted to set the fold in said strap.

2. In a strap-folding machine, the combination of a table formed with a slot, a pair of forming plates mounted edge-to-edge in said slot, a pair of feed-rolls of relatively-small diameter located below said slot and mounted for relative yielding movement, a second pair of feed-rolls of relatively-large diameter adapted to receive the strap from the first-said rolls, a pair of parallel blades adapted to double the blank and advance it past said forming-plates into the nip of the first pair of feed-rolls, and means for reciprocating said blades in a straight line through said slot.

3. In a strap-folding machine, the combination of a pair of doubling and folding blades each having inclined end edges substantially meeting at a point, means coöperating with said blades for tucking the corners of a doubled blank advanced by the blades, a pair of feed-rolls whose intermediate zones are adapted to admit the points of said blades within their peripheries, means for reciprocating said blades into and out of the space between said rolls, and means for positively rotating said rolls.

4. In a strap-folding machine, the combination of a pair of pointed doubling and folding blades, means to reciprocate them, a pair of formers working between said blades, and a pair of circumferentially-grooved feed-rolls adapted to receive the doubled strap from the doubling and folding blades and further advance it.

5. In a folding-machine, the combination of a blank-supporting table having a folding-slot, means for advancing the blanks across the slot, means for doubling the blanks through said slot, and a support intermittently movable over said slot.

6. In a strap-folding machine, the combination of a blank-supporting table having a folding-slot, means for advancing the blanks across said slot, means for doubling the blanks through said slot, and a pair of sliding supports movable toward and from each other to alternately cover and uncover said slot.

7. In a strap-folding machine, the combination of a blank-supporting table having a folding slot, means working through said slot for doubling the blank, and means adapted to operate on opposite sides of said folding means and prior to the latter, for initially depressing the middle portion of the blank.

8. In a strap-folding machine, the combination of a blank-supporting table having a folding-slot, a pair of breaker-blades movable into and out of said slot, and a doubling device mounted to reciprocate between the blades.

9. In a strap-folding machine, the combination of a blank-supporting table having a folding-slot, means for advancing a strip of material across said slot, means for alternately covering and uncovering the slot, a pair of breaker-blades movable into and out of the slot, a pair of stationary former-blades mounted in the slot, and a pair of pointed doubling and folding blades mounted to reciprocate through the slot between the breaker-blades and on opposite sides of the former blades.

10. In a strap-folding machine, the combination of a blank-supporting table having a slot, a vertically-reciprocating slide carrying a doubling device which works through said slot, a frame raised and lowered by said slide during the upper portion of the latter's movement and carrying a pair of breaker blades adapted to initially depress the middle of the blank, and means for yieldingly depressing said frame.

11. In a folding-machine, the combination of a blank-supporting table having a folding-slot, means for advancing a strip of material across the slot to form the blanks, means for doubling the blanks through said slot, means for severing the strip, and a smoother and flattener acting on the strip approaching the slot and having a peripheral speed greater than that of the strip.

12. In a strap-folding machine, the combination of a blank-supporting table having a slot, means for advancing the blanks across said slot, means for doubling the blanks through the slot, and means comprising a belt traveling faster than the blank-advancing means, and supporting and propelling devices for said belt, for smoothing and flattening the blank as it advances over the table toward said slot.

In testimony whereof I have hereunto set my hand in the presence of two subscribing witnesses, this 7th day of May, 1910.

ALBERT F. KESSLER.

Witnesses:
J. Leo Teller,
F. N. Vance.

---

Copies of this patent may be obtained for five cents each, by addressing the "Commissioner of Patents, Washington, D. C."